Sept. 10, 1963 L. J. HUBBARD ET AL 3,103,355

HINGED GATE DOCUMENT FEEDER

Filed April 18, 1962 3 Sheets-Sheet 1

INVENTORS.
LEO J. HUBBARD.
GERALD J. HECKEL.
BILLY M. LEYLAND.
BY William C. Cahill
ATTORNEY.

Sept. 10, 1963 L. J. HUBBARD ET AL 3,103,355

HINGED GATE DOCUMENT FEEDER

Filed April 18, 1962 3 Sheets-Sheet 2

INVENTORS.
LEO J. HUBBARD.
GERALD J. HECKEL.
BILLY M. LEYLAND.
BY William C. Cahill
ATTORNEY.

Sept. 10, 1963 L. J. HUBBARD ET AL 3,103,355

HINGED GATE DOCUMENT FEEDER

Filed April 18, 1962 3 Sheets-Sheet 3

INVENTORS.
LEO J. HUBBARD.
GERALD J. HECKEL.
BILLY M. LEYLAND.
BY William C. Cahill
ATTORNEY.

United States Patent Office 3,103,355
Patented Sept. 10, 1963

3,103,355
HINGED GATE DOCUMENT FEEDER
Leo J. Hubbard, Gerald J. Heckel, and Billy M. Leyland, Phoenix, Ariz., assignors to General Electric Company, a corporation of New York
Filed Apr. 18, 1962, Ser. No. 188,309
20 Claims. (Cl. 271—5)

This invention relates to document handling systems and more particularly to a document feeder for feeding documents from a stack of documents.

Document handling systems find numerous applications in the mechanical and electrical data processing systems and the like which are in widespread use today. Such document handling systems may be, for example, sorter devices which sort a large plurality of documents according to a prearranged scheme or may be document reading devices which read information contained on the documents and supply the information to an associated data processor. The information being read may be contained on the document in a number of ways, for example, in the form of magnetizable characters, punched holes or optical characters which the reading device recognizes.

The physical nature of the documents being read or handled may take a number of forms, such as relatively stiff and relatively thick punched cards which are widely known and used, or relatively thin and flexible bank checks.

The documents to be processed in such document handling systems are normally stored in stacks containing a large number of such documents. The systems usually include transport mediums through which the documents are transported serially to be read and to have the appropriate operations performed on them. The systems thus require some means for feeding the documents serially into the transport medium from the stack containing the documents. These means are usually called feeders or feeder devices.

In systems for operating upon relatively stiff documents, such as punched cards, the documents are usually fed into the transport medium by a device known as a picker knife. However, the picker knife tends to mutilate the edges of the document, with the resultant greater likelihood of malfunction within the system. Also, due to the inertia of the picker knife, there are upper speed limitations on such feeders.

There are two general types of feeders known in the prior art for feeding relatively thin documents such as bank checks into document handling systems, these being the use of feeders which separate documents by means of counter-directional driving devices and feeders which separate documents by vacuum devices.

In the first of the above mentioned types of feeders, the driving devices are usually adjacent belts or drums which rotate in opposite directions. The feed belt which drives in the desired feed direction which may be termed a forward drive belt, has a higher coefficient of friction with the documents than does the belt driving in the opposite direction, which may be termed a reverse drive belt. thus, a single document positioned between these belts travels in the desired feed direction due to the higher traction of the forward drive belt. The friction between the reverse drive belt and the document is less than that between the forward drive belt and the document but greater than that between two of the documents. Therefore, if more than one document is present between the belts, all those except the one in contact with the forward drive belt are driven away from the transport medium of the system by the reverse drive belt and the document adjacent the forward drive belt is fed into the transport medium of the system. In such devices it is difficult to maintain the proper balance of friction coefficients as the drive belts wear with use. Also, this type of feeder feeds documents in a random manner into the system and requires additional equipment to synchronize and orient the documents.

In the second of the above mentioned types of feeder devices used for flexible documents, the document is drawn against a feed belt or drum by a vacuum which produces enough force between the belt and the document to cause the document to be driven by the belt. An opposing vacuum may be used to separate other documents from the document to be driven. Difficulty is encountered with multiple feeds with this type of feeder due to the fact that the paper used may be relatively porous and the vacuum may attract one or more documents in the stack. In addition, if perforated checks or documents are utilized, the surfaces of adjacent checks are exposed to the vacuum through these perforations and the problem of multiple feed is aggravated. Also, if the documents tend to stick together for other reasons, such as mechanical, adhesive, or electrostatic forces, the separating action of the opposing vacuum force is sometimes not enough to separate the documents which are stuck together, and again multiple feed occurs. This type of feeder also feeds documents in a random manner and requires additional equipment to synchronize and orient the documents.

It is therefore an object of this invention to provide an improved document feeder for a document handling system.

It is another object of this invention to provide a document feeder for a document handling system which is capable of high rates of feed.

It is another object of this invention to provide a document feeder for a document handling system which does not mutilate or otherwise physically deface the documents being fed into the system.

It is another object of this invention to provide a document feeder for a document handling system which may feed either relatively stiff or relatively flexible documents into the system.

It is yet another object of this invention to provide a document feeder for a document handling system which will feed only the end document of a stack of documents into the transport medium of the system in response to a command signal.

Further objects and advantages of the present invention will become apparent to those skilled in the art as the description thereof proceeds.

Briefly stated, in accordance with one embodiment of the present invention, a document handling system is provided with a feeder device which includes a continuously energized accelerating medium, such as a continuously moving endless belt or a continuously rotating feeder capstan. A document support member is provided which supports a stack of documents and continuously urges the stack into contact with the accelerating medium. A gate, which may for example comprise a plurality of parallel finger elements, is provided which is normally positioned between the accelerating medium and the end document of the stack of documents to be fed into the system. The fingers are pivotally mounted at one end thereof near the leading edge of the end document of the stack. Upon receipt of a command signal, the gate member is pivoted such that the stack of documents is allowed to come into contact with the accelerating medium. The accelerating medium then drives the end document into the transport medium of the system. The gate member is returned to its normal position before the second document of the stack of documents comes into contact with the accelerating medium.

The invention both as to its organization and operation, together with further objects and advantages thereof, may best be understood by reference to the following description taken in connection with the accompanying drawings in which:

FIGURES 3, 4, 5 and 6 are sectional views taken along the line 3—3 of FIGURE 2 and are sequential views showing the operation of one embodiment of the invention.

Figure 1:
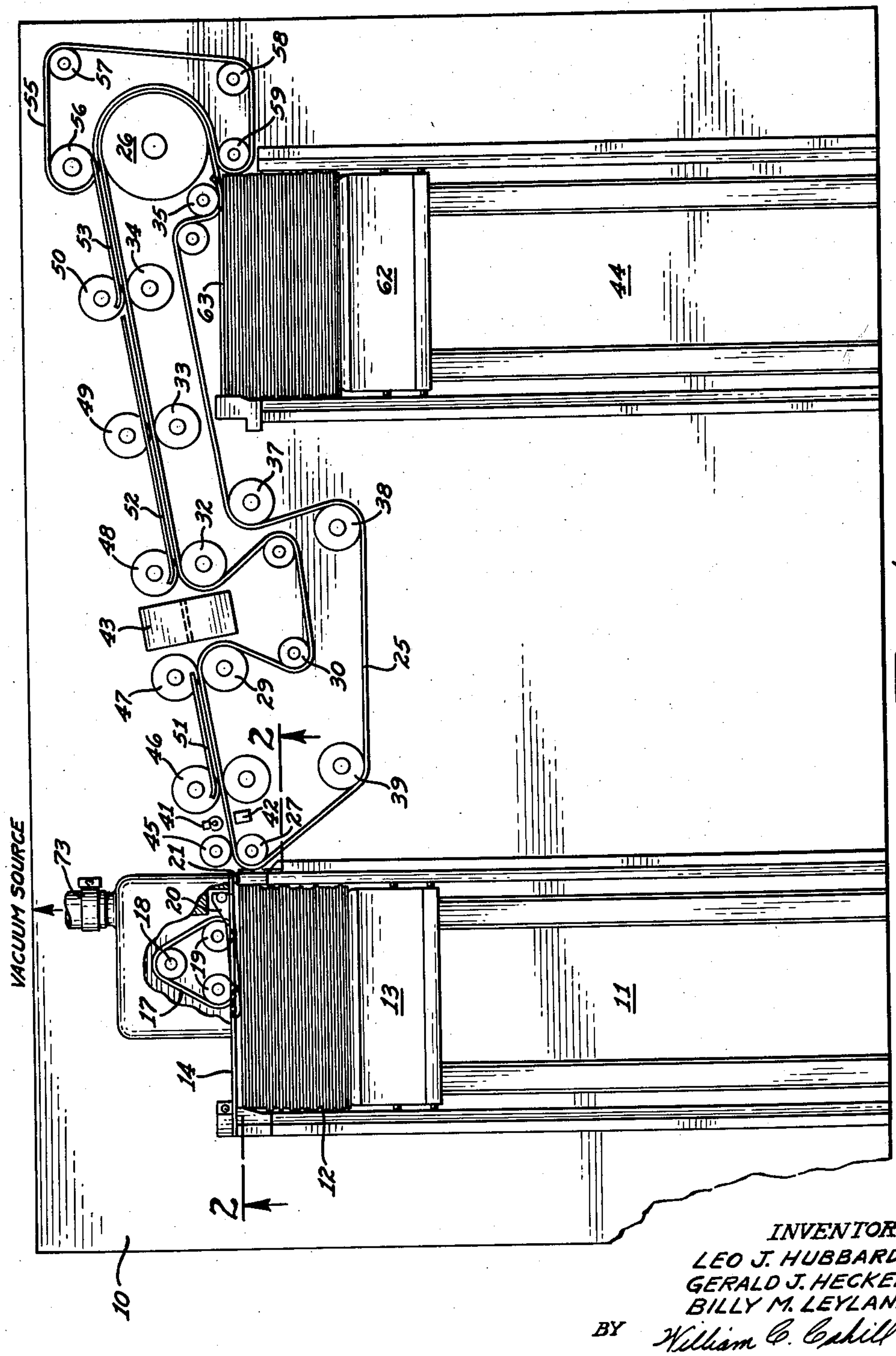
FIGURE 1 is a plan view of a document reading system in which the invention is embodied.

Referring to FIG. 1, the document reading system incorporating the teachings of the present invention is provided with a base plate 10 for maintaining the various elements of the device in proper operating relation with each other. An input hopper 11 is adapted to receive a stack of documents 12 to be read and includes a pusher plate 13 for supporting the stack of documents 12 and for continuously urging the stack of documents 12 into contact with feeder front plate 14. Feeder front plate 14 has suitable openings therein through which a continuously energized accelerating medium, which in the embodiment chosen for illustration comprises continuously energized endless belt means 17, may come into frictional contact with and drive the end document of the stack of documents 12 into a suitable transport medium. Accelerating belts 17 may be continuously driven by a drive capstan 18 and further supported by idler rollers 19. Hinged gate member 20, shown in its normally closed position, maintains the stack of documents 12 in a spaced relation with the feeder front plate 14 and out of contact with accelerating belts 17. Gate member 20 is adapted to pivot in response to a command signal at which time the pusher plate 13 urges the stack of documents 12 towards feeder front plate 14 and the end document of the stack of documents 12 comes into contact with accelerating belt 17 and is accelerated and driven by accelerating belt 17 through a throat region 21 and into a transport medium.

The transport medium includes an endless transport belt 25 driven by drive capstan 26 and supported by idler rollers 27–39. Upon the receipt of documents from the feeder, transport belt 25 carries the documents past a light source 41 and photoelectric cell 42, whose function and operation will later be described, through a reading station 43 and into an output hopper or stacker 44. Pinch rollers 45–50 and document guides 51–53 maintain the documents against and in driven relation with transport belt 25. Endless guide belt 55, supported by idler rollers 56–59, is frictionally driven by transport belt 25 and serves to guide the documents around drive capstan 26 and into the stacker 44.

Stacker 44 is similar to input hopper 11 in structure and includes a pusher plate 62 similar to pusher plate 13 which serves to support the documents in stacker 44 and to urge the documents into contact with stacker backup plate 63.

Any suitable means may be provided to cause pusher plates 13 and 62 to urge their associated stacks of documents into contact with feeder front plate 14 and stacker backup plate 63, respectively. For example, input hopper 11 and stacker 44 may be provided with a suitable slope such that the weight of pusher plates 13 and 62 provides the desired biasing forces. Any other suitable means, such as spring biasing means against pusher plates 13 and 62, could also provide the desired forces.

Figure 2:
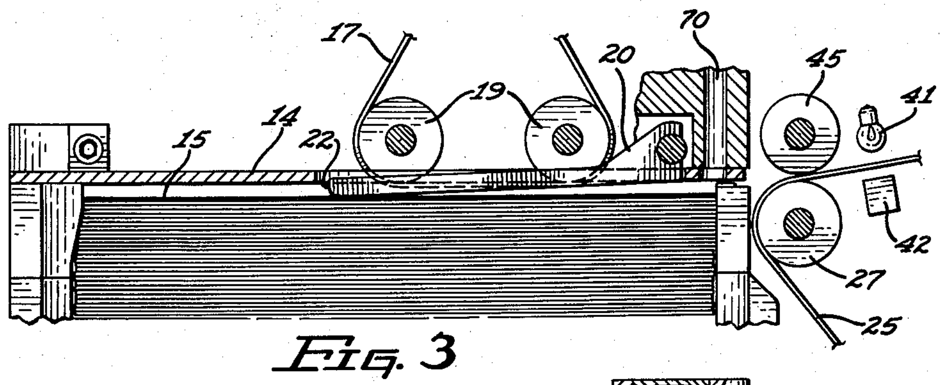
FIGURE 2 is a sectional view taken along the lines 2—2 of FIGURE 1.

FIGURE 2 shows a sectional view taken along the lines 2—2 of FIGURE 1 and shows a front view of feeder front plate 14, illustrating the openings therein through which the accelerating belts 17 extend. In the shown embodiment, three accelerating belts 17 are provided to effect a distributed driving force across the surface of a document when it is desired to feed the end document of the stack into the transport medium. Also shown are the openings in feeder front plate 14 through which a plurality of finger elements 22 of gate member 20 extend to perform their function of maintaining the stack of documents in spaced relation with the accelerating belts 17 when it is not desired to feed documents into the reader. As shown, finger element 22 is positioned on each side of each accelerating belt 17.

In response to a command signal, the gate member 20 is pivoted so as to withdraw the finger elements 22 into the openings in feeder front plate 14 and to allow the end document of the stack of documents to come into driven relation with the accelerating belts 17 and to be driven into the transport medium.

FIGURE 2 also shows a torque motor 65 mounted on the opposite side of base plate 10 and having a drive shaft 66 coupled by suitable coupling means 67 to the shaft of gate member 20. Torque motor 65 is a limited travel D.C. motor which includes a first set of windings which, when energized, positions gate member 20 in its open position and a second set of windings which, when energized, positions gate member 20 in its closed position. Torque motor 65 thus provides the driving force for moving gate member 20 between its open and closed positions.

Alternatively, gate member 20 could be moved from its open to its closed position in any suitable manner, such as by a linear travel solenoid having its armature connected to one of the finger elements 22 of gate member 20; however, in practice it has been found that the torque motor arrangement described is capable of much higher rates of operation, and thus much higher controlled rates of document feed.

FIGURE 2 further shows the pivotal mounting arrangement of the shaft of gate member 20, with gate member 20 being pivoted at its end nearest the leading edge of the documents to be fed into the transport medium. The advantage of pivoting gate member 20 in this manner will be later described. Also shown is the position of photoelectric cell 42, a first plurality of vacuum ports 68 in feeder front plate 14 which may be provided if desired to effect an additional attraction force for the end document of the stack of documents against accelerating belts 17, and a second plurality of vacuum ports 69. The vacuum ports 68 and 69 may conveniently communicate with a source of vacuum (not shown) by means of a vacuum conduit such as shown at 73 in FIGURE 1.

FIGURES 3, 4, 5 and 6 are sectional views taken along the lines 3—3 of FIGURE 2 and are sequential views showing the operation of this embodiment of the invention.

FIGURE 3 shows the relation between the elements of the feeder device at a time when no command signal is received and it is not desired to feed documents into the transport medium. Accelerating belts 17 and transport belt 25 are energized but gate member 20 is positioned in its closed position such that the finger elements 22 maintain the stack of documents 12 away from feeder front plate 14. Thus, the end document 15 of the stack of documents 12 is not allowed to come into contact with accelerating belts 17.

Figure 4:
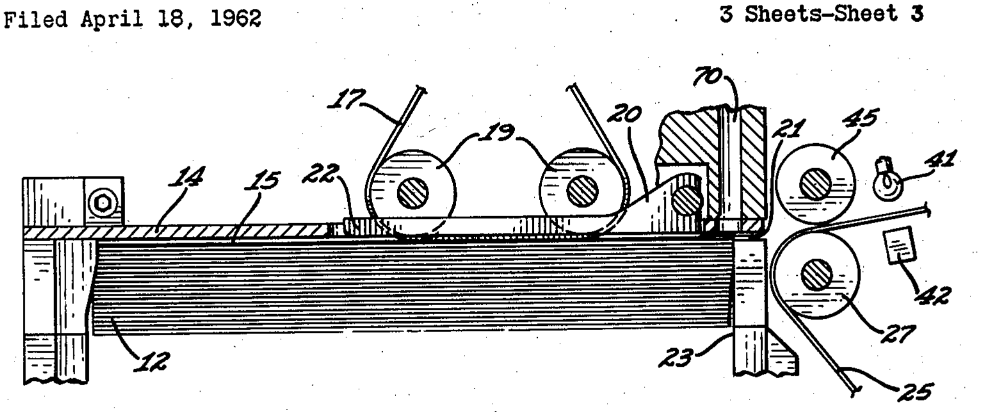

FIGURE 4 shows the relation of the components at the instant a command signal is received to feed a document into the transport medium. At this instant, gate member 20 is pivoted to allow the end document 15 of the stack of documents 12 to come into contact with accelerating belts 17, but because of the finite mass and inertia of document 15, it has not yet been driven by accelerating belts 17. Also shown is vacuum conduit 70 which connects vacuum ports 69 of FIGURE 2 to a suitable source of vacuum (not shown). This vacuum provides an attraction force for the leading edge of document 15 away from leading edge fence 23 of the input hopper 11 and facilitates movement of document 15 through the throat area 21 and into contact with transport belt 25.

Figure 5:
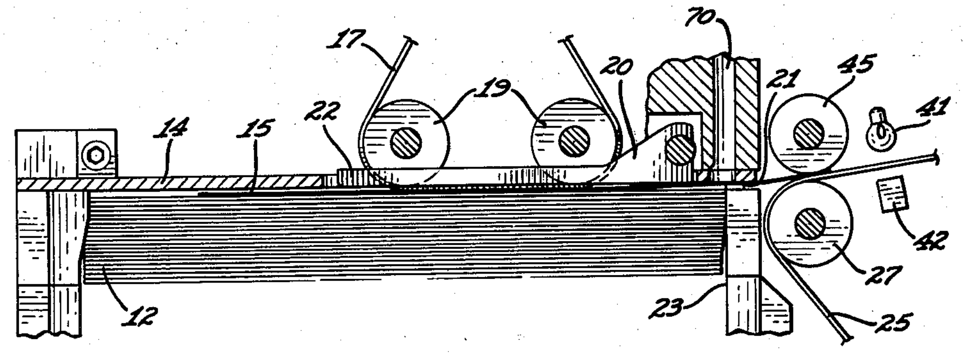

FIGURE 5 shows the relation of the components a short interval of time after that of FIGURE 4. As shown therein, end document 15 has been accelerated by accelerating belts 17 and has been moved through throat area 21 such that the leading edge of document 15 is now in contact with transport belt 25 and pinch roller 45 and is now being driven by transport belt 25. Gate member 20 may now be returned to its closed position since end document 15 is now being driven by belt 25. One suitable manner for controlling the time at which gate member 20 is returned to its closed position will be later described.

At this point it is observed that as gate member 20 is pivoted from its closed to its open position, the first portion of accelerating belts 17 to come into contact with end document 15 is the portion nearest the leading edge of document 15 and that as gate member 20 continues its movement from its closed to its open position the remaining exposed portions of accelerating belts 17 contact document 15 progressively from near the leading edge to near the trailing edge. This results in the driving force being applied orignally along the surface near the leading edge of document 15, and ultimately along most of the document's length including the portions of the document nearer the trailing edge thereof. Thus, by pivoting gate member 20 near the leading edge of the documents, and thereby permitting the leading edge to contact belts 17 first and following portions of document 15 progressively later, the document 15 is pulled through throat area 21 rather than being pushed through by a force applied to the trailing edge of document 15, thereby eliminating any tendency of document 15 to buckle when the driving force is first applied to the document. In prior art devices this tendency to buckle upon the first application of a driving force has been one of the primary factors limiting the upper range of speeds at which document feeder devices could be operated.

Figure 6:
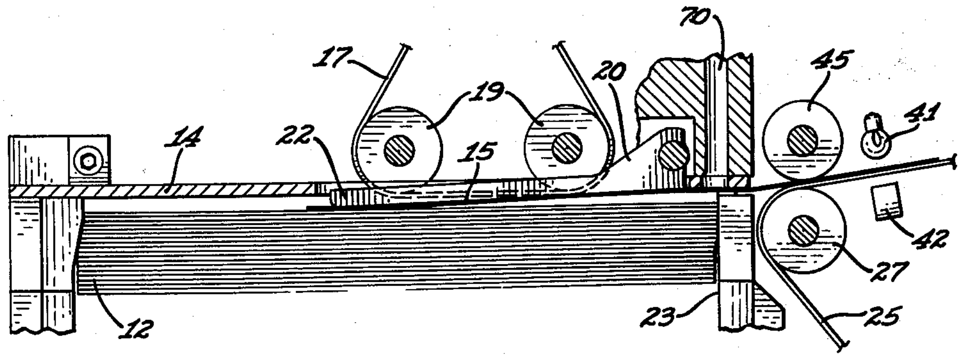

FIGURE 6 shows the relation of the components a short interval of time after that of FIGURE 5. As shown therein, document 15 has been advanced further by transport belt 25 until the leading edge of document 15 has passed between light source 41 and photoelectric cell 42, thereby interrupting the path of light between these two elements. Upon this interruption, a signal is provided to torque motor 65 (shown in FIG. 2) to return gate member 20 to its closed position such that the finger elements 22 thereof once again maintain the stack of documents 12 in spaced relation with feeder front plate 14 and out of contact with accelerating belts 17.

The interval of time during which gate member 20 remains in its open position may be called the dwell time of the gate. The described photoelectric control arrangement allows a variable dwell time for each document fed into the transport medium if necessary and assures both that the gate member 20 remains open until document 15 is being driven by transport belt 25 and that gate member 20 closes before the next document comes into contact with accelerating belts 17. This allows the feeder device to operate on a stack of documents containing individual documents having varying physical and frictional characteristics.

Figure 7:
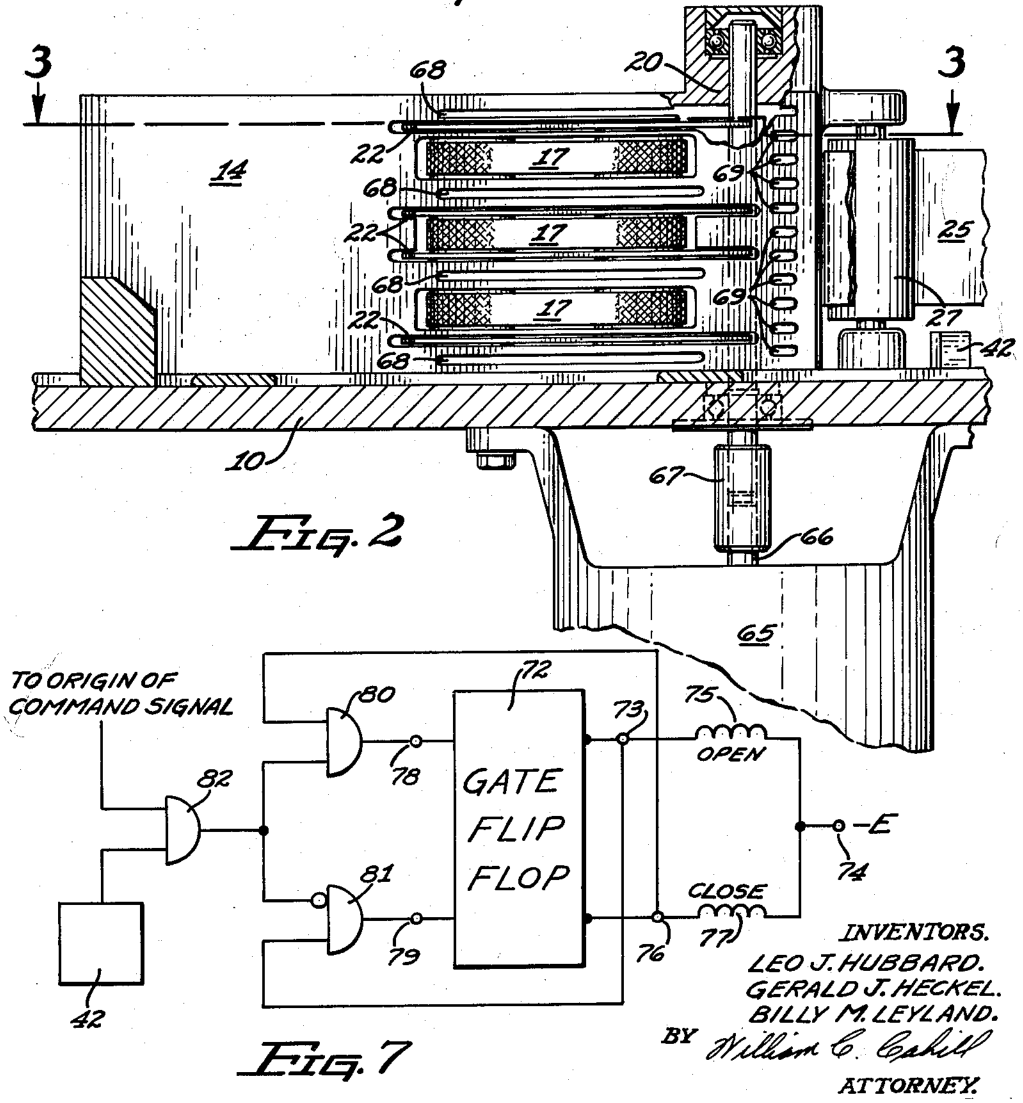
FIGURE 7 is a schematic diagram illustrating a control circuit suitable for use in the present invention.

FIGURE 7 shows the schematic diagram of a circuit arrangement which may be used to effect the previously described control of gate member 20 of the feeder device. Therein is shown a Gate Flip-Flop 72 having one output terminal 73 connected to the negative terminal 74 of a source of electrical energy through the "open" winding 75 of torque motor 65 and having its other output terminal 76 connected to terminal 74 through the "close" winding 77 of torque motor 65. The positive terminal of the source (not shown) may be connected to a point of reference potential, such as ground.

As is well known to those skilled in the art, flip-flop circuits have two output terminals and are capable of assuming either of two stable steady states, in one of which a first of the output terminals has a positive potential with respect to the second and the other of which the second output terminal has a positive potential with respect to the first output terminal.

Gate Flip-Flop 72 also includes two input terminals 78 and 79. The state of Gate Flip-Flop 72 is dependent upon which of the input terminals 78 and 79 last received an input signal. If input terminal 78 last received an input signal, output terminal 73 is positive with respect to output terminal 76. At this time, Gate Flip-Flop 72 may be said to be in its set condition. Conversely, if input terminal 79 last received an input signal, then output terminal 76 is positive with respect to output terminal 73. Gate Flip-Flop 72 is now said to be in its reset condition.

In the arrangement shown in FIGURE 7, terminal 74 is connected to the negative terminal of the source of electrical energy. Therefore, when terminal 73 is positive, a net voltage exists across "open" winding 75, and gate member 20 of the previous figures is in its open position. At this time output terminal 76 is negative and thus no net voltage exists across the "close" winding 77. However, if an input signal is applied to input terminal 79, Gate Flip-Flop 72 transfers to its reset condition and output terminal 76 becomes positive with output terminal 73 becoming negative. At this time, a net voltage exists across "close" winding 77 and no net voltage exists across "open" winding 75, thereby effecting the transfer of gate member 20 to its closed position. "Close" winding 77 remains energized until an input signal is applied to input terminal 78, setting Gate Flip-Flop 72, energizing "open" winding 75 and transferring gate member 20 to its open position.

Input signals to input terminals 78 and 79 of Gate Flip-Flop 72 are provided through AND logic gates 80 and 81, respectively. Each of these AND gates 80 and 81 has two input terminals, with one of the input terminals of AND gate 80 being connected to output terminals 76 of Gate Flip-Flop 72 and one of the input terminals of AND gate 81 being connected to output terminal 73 of Gate Flip-Flop 72. The other input terminal of each of the AND gates 80 and 81 is connected to the output terminal of AND gate 82. AND gates 80 and 82 are of such a nature that they each provide an output signal only upon the occurrence of input signals applied to both of the input terminals of the respective AND gates. AND gate 81 is of such a nature that it provides an output signal only upon the occurrence of an output signal from output terminal 73 of Gate Flip-Flop 72 and upon the non-occurrence of an output signal from AND gate 82. AND gate 82 has two input terminals, one of which is connected to photoelectric cell 42, which provides an output signal whenever light from light source 41 (shown in FIGS. 3–6) falls on the photoelectric cell 42, and the other of which is connected to the origin of a command signal which indicates that it is desired to feed documents into the document reader. For example, the original of the command signal could be an associated computer or a manually operated switch which may be used to commence operation of the document reading device. Logic gates and flip-flops having characteristics such as those described are well known to those skilled in the art. For example, circuits suitable for use in such logic gates and flip-flops are disclosed by Lloyd P. Hunter, in Handbook of Semiconductor Electronics, published by McGraw-Hill Book Co. in 1956.

The operation of the embodiment chosen for illustration is as follows: Gate Flip-Flop 72 is normally in its reset condition, whereby output terminal 76 is positive and "close" winding 77 is energized, thereby positioning gate member 20 in its closed position. At this time no documents are being transported by transport belt 25 and accordingly light from light source 41 falls on photoelectric cell 42, resulting in an output signal from photoelectric cell 42 which is applied to AND gate 82. Upon the occurrence of a command signal, AND gate 82 provides an output signal which, when combined in AND gate 80 with the output signal from Gate Flip-Flop terminal 76, results in an input signal being applied to input terminal 78 of Gate Flip-Flop 72, thereby setting Gate Flip-Flop 72 and resulting in output terminal 73 becoming positive. This energizes "open" winding 75 and results in gate member 20 being placed in its open position, thereby allowing the end document 15 to be fed into the transport medium. The occurrence of the positive signal at output terminal 73 results in the application of one of the two input signals to AND gate 81.

When end document 15 has traveled a suitable distance such that its leading edge cuts the light path between light source 41 and photoelectric cell 42, AND gate 82 ceases to provide an output signal. Upon the non-occurrence of an output signal from AND gate 82, AND gate 81 provides an output signal to input terminal 79 of Gate Flip-Flop 72, thereby resetting Gate Flip-Flop 72. Output terminal 76 now becomes positive, with the resultant energization of "close" winding 77 and the assmption of gate member 20 of its closed position. Gate member 20 remains closed until the trailing edge of the end document 15 passes the light source 41, at which time photoelectric cell 42 again provides an output signal and gate member 20 is again opened to allow the next end document to be fed into the transport medium. This serial feeding operation continues until the command signal is removed from AND gate 82, at which time gate member 20 assumes its closed position and the card reader ceases to operate. The document reader remains inoperative until a command signal is again received by AND gate 82, at which time the previously described cycle of operation is repeated.

While the principles of the invention have now been made clear in an illustrative embodiment, there will be immediately obvious to those skilled in the art many modifications in structure, arrangement, proportions, the elements, materials and components used in the practice of the invention, and otherwise, which are particularly adapted for specific environment and operating requirements, without departing from those principles. The appended claims are therefore intended to cover and embrace any such modifications, within the limits only of the true spirit and scope of the invention.

What is claimed as new and desired to secure by Letters Patent of the United States is:

1. A device for feeding the end document of a stack of documents into a transport medium in response to a command signal, comprising an accelerating medium, means for urging the end document of a stack of documents into contact with said accelerating medium, gate means positioned adjacent said end document and said accelerating medium, said gate means being rotatable between a first position in which said gate means is positioned between said accelerating medium and said end document and a second position in which said accelerating medium is positioned between said gate means and said end document, and means responsive to a command signal for rotating said gate means from its first to its second position for bringing said end document into driving relation with said accelerating medium and for feeding it into said transport medium.

2. A device for feeding the end document of a stack of documents into a transport medium in response to a command signal, comprising endless belt accelerating means, means for urging the end document of a stack of documents into contact with said accelerating belt means, gate means positioned adjacent said end document and said accelerating belt means, said gate means being rotatable between a first position in which said gate means is positioned between said accelerating belt means and said end document and a second position in which said accelerating belt means is positioned between said gate means and said end document, and means responsive to a command signal for rotating said gate means from its first to its second position for bringing said end document into driving relation with said accelerating belt means and for feeding it into a transport medium.

3. A device for feeding the end document of a stack of documents into a transport medium in response to a command signal, comprising continuously energized endless accelerating belt means, means for urging a stack of documents into contact with said accelerating belt means, gate means including a plurality of parallel finger elements positioned adjacent to said accelerating belt means and said end document, said gate means being rotatable between a first position in which said finger elements are positioned between said accelerating belt means and said end document and a second position in which said accelerating belt means is positioned between said finger elements and said end document, and means responsive to a command signal for rotating said gate means from its first to its second position for bringing said end document into driving relation with said accelerating belt means and for feeding it into a transport medium.

4. A device for feeding the end document of a stack of documents into a transport medium in response to a command signal comprising, an input hopper adapted to receive a stack of documents, continuously energized endless accelerating belt means positioned at one end of said input hopper, means for urging said stack of documents into contact with said accelerating belt means, gate means including a plurality of parallel finger elements positioned adjacent to said accelerating belt means and said end document, said gate means being rotatable between a first position in which said finger elements are positioned between said accelerating belt means and said end docment and a second position in which said accelerating belt means is positioned between said finger elements and said end document, a throat region positioned at said one end of said input hopper and through which said end document is fed into a transport medium, vacuum means for attracting the leading edge of said end document into said throat region, and means responsive to a command signal for rotating said gate means from its first to its second position for bringing said end document into driving relation with said accelerating belt means and for feeding it through said throat region into said transport medium.

5. A device for feeding the end document of a stack of documents into a transport medium in response to a command signal, comprising continuously energized endless accelerating belt means, gate means including a plurality of parallel finger elements positioned adjacent to said accelerating belt means and said end document, said gate means being rotatable between a first position in which said finger elements are positioned between said accelerating belt means and said end document and a second position in which said accelerating belt means is positioned between said finger elements and said end document, and a torque motor responsive to a command signal for rotating said gate means from its first to its second position for bringing said end document into driving relation with said accelerating medium and for feeding it into a transport medium.

6. A device for feeding the end document of a stack of documents into a transport medium in response to a command signal, comprising an input hopper adapted to receive a stack of documents, continuously energized endless accelerating belt means positioned at one end of said input hopper, means for urging said stack of documents into contact with said accelerating belt means, gate means including a plurality of parallel finger elements positioned adjacent to said accelerating belt means and said end document, said gate means being rotatable between a first position in which said finger elements are positioned between said accelerating belt means and said end document and a second position in which said accelerating belt means is positioned between said finger elements and said end document, a throat region positioned at said one end of said input hopper and through which said end document is fed into a transport medium, vacuum means for attracting the leading edge of said end document into said throat region, and a torque motor responsive to a command signal for rotating said gate means from its first to its second position for bringing said end document into driving relation with said accelerating belt means and for feeding it through said throat region into said transport medium.

7. A device for feeding the end document of a stack of documents into a transport medium in response to a command signal, comprising an input hopper adapted to receive a stack of documents, continuously energized accelerating belt means positioned at one end of said input hopper, means for urging said stack of documents into contact with said accelerating belt means, gate means including a plurality of parallel finger elements positioned adjacent to said accelerating belt means and said end document, said gate means being rotatable between a first position in which said finger elements are positioned between said accelerating belt means and said end document and a second position in which said accelerating belt means is positioned between said finger elements and said end document, a throat region positioned at said one end of said input hopper and through which said end document is fed into a transport medium, vacuum means for attracting the leading edge of said end document into said throat region, a torque motor responsive to a command signal for rotating said gate means from its first to its second position for bringing said end document into driving relation with said accelerating belt means and for feeding it through said throat region into said transport medium, and means for rotating said gate member from its second to its first position when said end document reaches a predetermined position in said transport medium.

8. A device for feeding the end document of a stack of documents into a transport medium in response to a command signal, comprising an input hopper adapted to receive a stack of documents, continuously energized endless accelerating belt means positioned at one end of said input hopper, means for urging said stack of documents into contact with said accelerating belt means, gate means including a plurality of parallel finger elements positioned adjacent to said accelerating belt means and said end document, said gate means being rotatable between a first position in which said finger elements are positioned between said accelerating belt means and said end document and a second position in which said accelerating means is positioned between said finger elements and said end document, a throat region positioned at said one end of said input hopper and through which said end document is fed into a transport medium, vacuum means for attracting the leading edge of said end document into said throat region, a torque motor responsive to a command signal for rotating said gate means from its first to its second position for bringing said end document into driving relation with said accelerating belt means and for feeding it through said throat region into said transport medium, photoelectric means for detecting when the leading edge of said end document reaches a predetermined position in said transport medium, and means responsive to said photoelectric means for rotating said gate member from its second to its first position when the leading edge of said end document reaches said predetermined position.

9. A device for feeding the end document of a stack of documents into a transport medium in response to a command signal, comprising an input hopper adapted to receive a stack of documents, continuously energized endless accelerating belt means positioned at one end of said input hopper, means for urging said stack of documents into contact with said accelerating belt means, gate means including a plurality of parallel finger elements positioned adjacent to said accelerating belt means and said end document, said gate means being rotatable between a first position in which said finger elements are positioned between said accelerating belt means and said end document and a second position in which said accelerating belt means is positioned between said finger elements and said end document, a throat region positioned at said one end of said input hopper and through which said end document is fed into a transport medium, a torque motor responsive to a command signal for rotating said gate means from its first to its second position for bringing said end document into driving relation with said accelerating belt means and for feeding it through said throat region into said transport medium, and means for rotating said gate member from its second to its first position when said end document reaches a predetermined position in said transport medium.

10. A device for feeding the end document of a stack of documents into a transport medium in response to a command signal, comprising an input hopper adapted to receive a stack of documents, continuously energized endless accelerating belt means positioned at one end of said input hopper, means for urging said stack of documents into contact with said accelerating belt means, gate means including a plurality of parallel finger elements positioned adjacent to said accelerating belt means and said end document, said gate means being rotatable between a first position in which said finger elements are positioned between said accelerating belt means and said end document and a second position in which said accelerating belt means is positioned between said finger elements and said end document, a throat region positioned at said one end of said input hopper and through which said end document is fed into a transport medium, a torque motor responsive to a command signal for rotating said gate means from its first to its second position for bringing said end document into driving relation with said accelerating belt means and for feeding it through said throat region into said transport medium, photoelectric means for detecting when the leading edge of said end document reaches a predetermined position in said transport medium, and means responsive to said photoelectric means for rotating said gate member from its second to its first position when the leading edge of said end document reaches said predetermined position.

11. A device for feeding the end document of a stack of documents into a transport medium in response to a command signal, comprising continuously energized endless accelerating belt means, means for urging a stack of documents into contact with said accelerating belt means, gate means including a plurality of parallel finger elements positioned adjacent to said accelerating belt means and said end document, said gate means being rotatable between a first position in which said finger elements are positioned between said accelerating belt means and said end document and a second position in which said accelerating belt means is positioned between said finger elements and said end document, means responsive to a command signal for rotating said gate means from its first to its second position for bringing said end document into driving relation with said accelerating medium and for feeding it into a transport medium, and means for rotating said gate member from its second to its first position when the leading edge of said end document reaches a predetermined position in said transport medium.

12. A device for feeding the end document of a stack of documents into a transport medium in response to a command signal, comprising continuously energized endless accelerating belt means, means for urging a stack of documents into contact with said accelerating belt means, gate means including a plurality of parallel finger elements positioned adjacent said accelerating belt means and said end document, said gate means being rotatable between a first position in which said finger elements are positioned between said accelerating belt means and said end document and a second position in which said accelerating belt means is positioned between said finger elements and said end document, means responsive to a command signal for rotating said gate means from its first to its second position for bringing said end document into driving relation with said accelerating belt means and for feeding it into a transport medium, photoelectric means for detecting when the leading edge of said end document reaches a predetermined position in said transport medium, and means responsive to said photoelectric means for rotating said gate member from its second to its first position when the leading edge of said end document reaches said predetermined position.

13. A device for feeding the end document of a stack of documents into a transport medium in response to a command signal, comprising an accelerating medium, means for urging a stack of documents into contact with said accelerating medium, gate means positioned adjacent the end document of said documents and said accelerating medium, said gate means being rotatable between a first position in which said gate means is positioned between said accelerating medium and said end document and a second position in which said accelerating medium is positioned between said gate means and said end document, means responsive to a command signal for rotating said gate means from its first to its second position for bringing said end document into driving relation with said accelerating medium and for feeding it into a transport medium, photoelectric means for detecting when the leading edge of said end document reaches a predetermined position in said transport medium, and means responsive to said photoelectric means for rotating said gate means from its second to its first position when the leading edge of said end document reaches said predetermined position.

14. A device for feeding the end document of a stack of documents into a transport medium in response to a command signal, comprising an accelerating medium, means for urging a stack of documents into contact with said accelerating medium, gate means positioned adjacent the end document of said documents and said accelerating medium, said gate means being rotatable between a first position in which said gate means is positioned between said accelerating medium and said end document and a second position in which said accelerating medium is positioned between said gate means and said end document, means responsive to a command signal for rotating said gate means from its first to its second position for bringing said end document into driving relation with said accelerating medium and for feeding it into a transport medium, and means for rotating said gate member from its second to its first position when the leading edge of said end document reaches a predetermined position in said transport medium.

15. A device for feeding the end document of a stack of documents into a transport medium in response to a command signal, comprising an accelerating medium, means for urging a stack of documents into contact with said accelerating medium, means for normally maintaining said stack of documents in spaced relation with said accelerating medium, means responsive to a command signal for moving said stack of documents into contact with said accelerating medium for bringing the end document of said stack of documents into driving relation with said accelerating medium and for feeding it into a transport medium, and means for returning said stack of documents to a spaced relation with said accelerating medium when said end document reches a predetermined position in said transport medium.

16. A document handling system comprising an input hopper adapted to receive a stack of documents to be read, a reading station, an output hopper, a transport medium for transporting documents from said input hopper to said reading station and then to said output hopper, a document feeding device for serially feeding the documents in said stack of documents into said transport medium in response to a command signal, said document feeding device comprising an accelerating medium, means for urging said stack of documents into contact with said accelerating medium, means normally maintaining said stack of documents in spaced relation with said accelerating medium, means responsive to said command signal for moving said stack of documents into contact with said accelerating medium for bringing the end document of said stack of documents into driving relation with said accelerating medium and for feeding it into said transport medium, and means for returning said stack of documents to a spaced relation with the said accelerating medium when the leading edge of said end document reaches a predetermined position in said transport medium.

17. A document handling system comprising an input hopper adapted to receive a stack of documents to be read, a reading station, an output hopper, a transport medium for transporting documents from said input hopper to said reading station and then to said output hopper, a document feeding device for serially feeding the documents in said stack of documents into said transport medium in response to a command signal, said document feeding device comprising an accelerating medium, means for urging said stack of documents into contact with said accelerating medium, gate means positioned adjacent the end document of said stack of documents and said accelerating medium, said gate means being rotatable between a first position in which the gate means is positioned between said accelerating medium and said end document and a second position in which said accelerating medium is positioned between said gate means and said end document, and means responsive to said command signal for rotating said gate means from its first to its second position for bringing said end document into driving relation with said accelerating medium and for feeding it into said transport medium.

18. A document handling system comprising an input hopper adapted to receive a stack of documents to be read, a reading station, an output hopper, a transport medium for transporting documents from said input hopper to said reading station and then to said output hopper, a document feeding device for serially feeding the documents in said stack of documents into said transport medium in response to a command signal, said document feeding device comprising a continuously energized endless accelerating belt means positioned at one end of said input hopper, means for urging said stack of documents into contact with said accelerating belt means, gate means including a plurality of parallel finger elements positioned adjacent to said accelerating belt means and the end document of said stack of documents, said gate means being rotatable between a first position in which said finger elements are positioned between said accelerating belt means and said end document and a second position in which said accelerating belt means are positioned between said finger elements and said end document, a throat region positioned at said one end of said input hopper and through which said end document is fed into said transport medium, vacuum means for attracting the leading edge of said end document into said throat region, and means responsive to said command signal for rotating said gate member from its first to its second position for bringing said end document into driving relation with said accelerating belt means and for feeding it through said throat region into said transport medium.

19. A document handling system comprising an input hopper adapted to receive a stack of documents to be read, a reading station, an output hopper, a transport medium for transporting documents from said input hopper to said reading station and then to said output hopper, a document feeding device for serially feeding the documents in said stack of documents into said transport medium in response to a command signal, said document feeding device comprising a continuously energized endless accelerating belt means, means for urging said stack of documents into contact with said accelerating belt means, gate means including a plurality of parallel finger elements positioned adjacent said accelerating belt means and the end document of said stack of documents, said gate means being rotatable between a first position in which said finger elements are positioned between said accelerating belt means and said end document and a second position in which the accelerating belt means is positioned between said finger elements and said end document, means responsive to said command signal for rotating said gate means from its first to its second position for bringing said end document into driving relation with said accelerating belt means and for feeding it into said transport medium, and means for rotating said gate means from its second to its first position when the leading edge of said end document reaches a predetermined position in said transport medium.

20. A document handling system comprising an input hopper adapted to receive a stack of documents to be read, a reading station, an output hopper, a transport medium for transporting documents from said input hopper to said reading station and then to said output hopper, a document feeding device for serially feeding the documents in said stack of documents into said transport medium in response to a command signal, said document feeding device comprising a continuously energized endless accelerating belt means positioned at one end of said input hopper, means for urging said stack of documents into contact with said accelerating belt means, gate means including a plurality of parallel finger elements positioned adjacent to said accelerating belt means and the end document of said stack of documents, said gate means being rotatable between a first position in which said finger elements are positioned between said accelerating belt means and said end document and a second position in which said accelerating belt means is positioned between said finger elements and said end documents, a throat region positioned at said one end of said input hopper and through which said end document is fed into said transport medium, vacuum means for attracting the leading edge of said end document into said throat region, a torque motor responsive to said command signal for rotating said gate means from its first to its second position for bringing said end document into driving relation with said accelerating belt means and for feeding it through said throat region and into said transport medium, photoelectric means for determining when the leading edge of said end document reaches a predetermined position in said transport medium, and means responsive to said photoelectric means for rotating said gate means from its second to its first position when the leading edge of said end document reaches said predetermined position.

References Cited in the file of this patent

UNITED STATES PATENTS

| | | |
|---|---|---|
| 2,956,801 | Coakley | Oct. 18, 1960 |
| 2,989,306 | Ramm | June 20, 1961 |